United States Patent
Sakamoto

(10) Patent No.: US 9,436,878 B2
(45) Date of Patent: Sep. 6, 2016

(54) LANE MARK RECOGNITION DEVICE

(71) Applicant: HONDA MOTOR CO., LTD., Minato-ku, Tokyo (JP)

(72) Inventor: Yosuke Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/658,620

(22) Filed: Mar. 16, 2015

(65) Prior Publication Data

US 2015/0278612 A1    Oct. 1, 2015

(30) Foreign Application Priority Data

Apr. 1, 2014    (JP) ................. 2014-075846

(51) Int. Cl.
*G06K 9/00* (2006.01)
*G06T 7/00* (2006.01)
*B62D 15/02* (2006.01)

(52) U.S. Cl.
CPC ......... *G06K 9/00798* (2013.01); *B62D 15/025* (2013.01); *G06T 7/0085* (2013.01); *G06T 2207/10024* (2013.01); *G06T 2207/30256* (2013.01)

(58) Field of Classification Search
CPC ............ G06K 9/00798; G06T 7/0085; G06T 2207/30256; G06T 2207/10024; B62D 15/025
See application file for complete search history.

(56) References Cited

U.S. PATENT DOCUMENTS

| | | | | |
|---|---|---|---|---|
| 2009/0041303 A1* | 2/2009 | Aoki | .................. | G06K 9/00798 382/104 |
| 2009/0245582 A1* | 10/2009 | Sakamoto | .......... | G06K 9/00798 382/104 |
| 2011/0121992 A1* | 5/2011 | Konaka | ................ | B62D 15/029 340/905 |
| 2011/0219632 A1* | 9/2011 | Odom | .................. | A01B 69/007 33/228 |
| 2012/0072080 A1* | 3/2012 | Jeromin | ............. | G06K 9/00798 701/49 |
| 2012/0194677 A1* | 8/2012 | Suzuki | ............... | G06K 9/00798 348/148 |
| 2012/0206252 A1* | 8/2012 | Sherony | ................ | B60W 30/12 340/438 |
| 2013/0335213 A1* | 12/2013 | Sherony | ................ | G08G 1/167 340/439 |
| 2014/0200801 A1* | 7/2014 | Tsuruta | ................. | B60W 30/00 701/400 |

FOREIGN PATENT DOCUMENTS

JP    2005-157731 A    6/2005

OTHER PUBLICATIONS

Machine translation of 2005-157731, Nissan, Takeda Seiji, Jun. 16, 2005.*

* cited by examiner

*Primary Examiner* — Rodney Butler
*Assistant Examiner* — Frederick Brushaber
(74) *Attorney, Agent, or Firm* — Carrier Blackman & Associates, P.C.; Joseph P. Carrier; Jeffrey T. Gedeon

(57) ABSTRACT

An edge image generating unit 12 generates an edge image, into which edge points whose variation in luminance relative to a surrounding portion is equal to or more than a predetermined value have been extracted, from an image captured by a camera 2. A candidate image portion extracting unit 13 extracts a candidate image portion, which is a candidate for an image portion of a lane mark, from the edge image. A lane mark recognizing unit 14 detects a lane mark candidate on the basis of the candidate image portion and, in the case of having detected a plurality of lane mark candidates 51b to 54b and 61b to 63b adjacent to each other, compares the luminance of a corresponding area in the captured image for each of the lane mark candidates and recognizes the lane mark candidate 51b to 54b having the maximum luminance value as a lane mark.

6 Claims, 5 Drawing Sheets

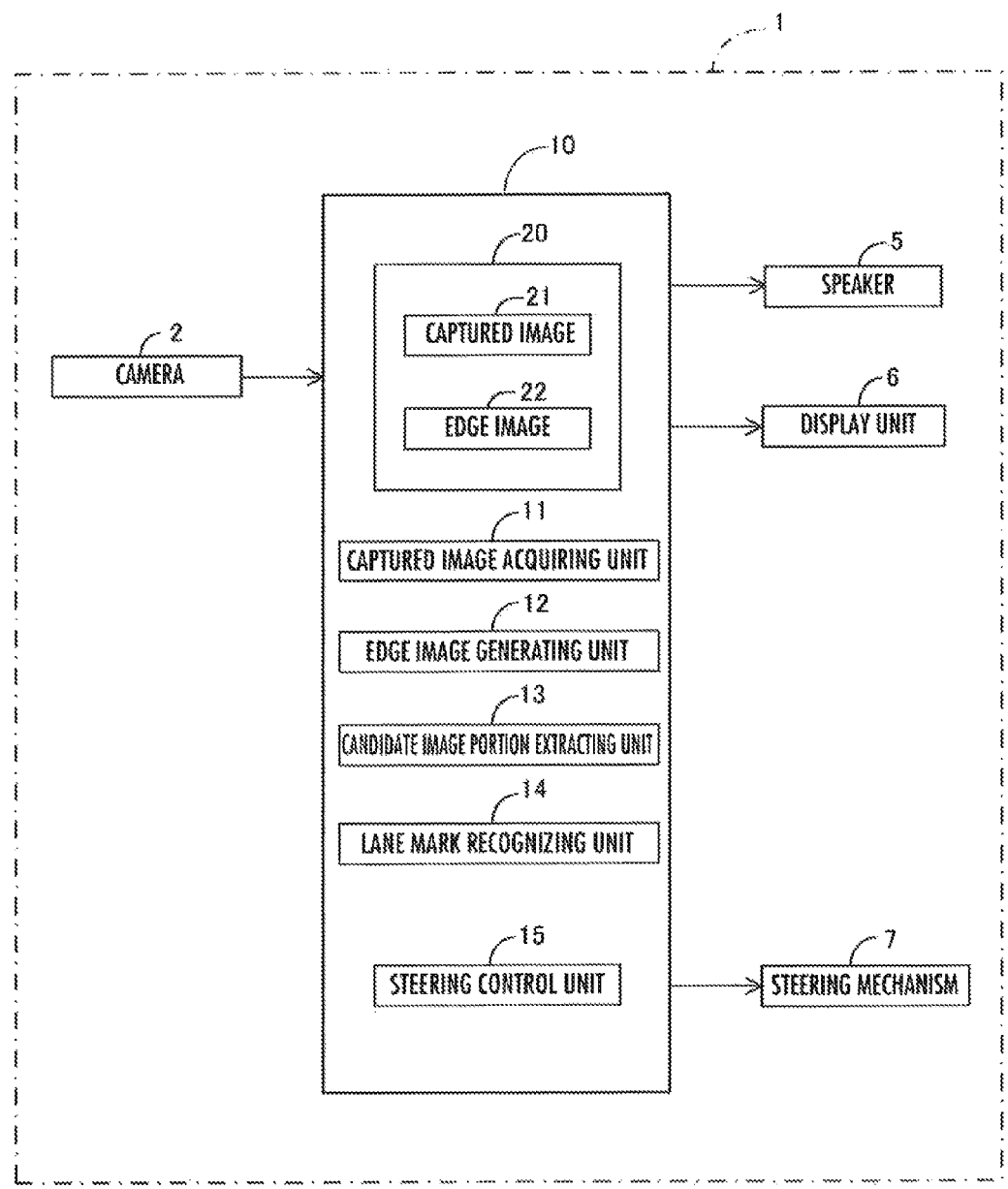

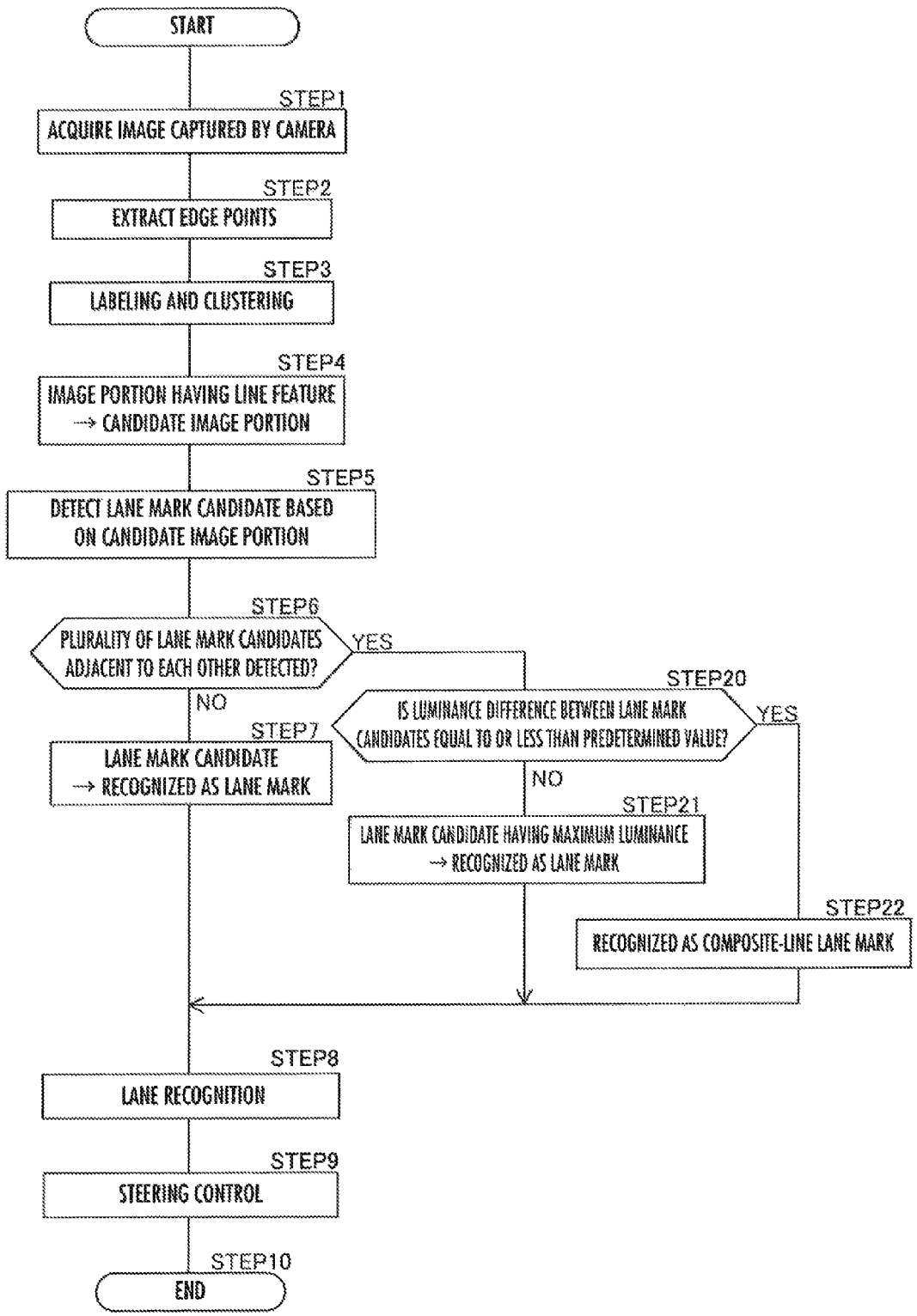

LANE MARK RECOGNITION DEVICE

CROSS-REFERENCE TO RELATED APPLICATION

Priority is claimed under 35 U.S.C. 119 on Japanese Patent Application No. 2014-075846, filed on Apr. 1, 2014, the contents of which are incorporated herein by reference.

BACKGROUND OF THE INVENTION

1. Field of the Invention

The present invention relates to a lane mark recognition device which recognizes a lane mark provided on a road on the basis of an image captured by a camera mounted in a vehicle.

2. Description of the Related Art

Conventionally, there has been known a lane mark recognition device which recognizes a lane mark such as a white line for dividing a traveling lane provided on a road from an image of the road ahead of a vehicle captured by a camera mounted in the vehicle.

The conventional lane mark recognition device might erroneously recognize a repair mark of a lane mark as a lane mark in the case where the luminance of the repair mark of the lane mark is higher than the road luminance, thus having a low recognition accuracy of a lane mark.

The present invention has been provided in view of the above background. Therefore, an object of the present invention is to provide a lane mark recognition device which prevents a repair mark of a lane mark from being erroneously recognized as a lane mark.

SUMMARY OF THE INVENTION

The present invention relates to a lane mark recognition device, which recognizes a lane mark provided on a road based on an image of the surroundings of a vehicle captured by a camera mounted to the vehicle, and a vehicle and a lane mark recognition method therefor.

Furthermore, the lane mark recognition device according to the present invention includes: an edge image generating unit which generates an edge image, into which edge points whose variation in luminance relative to a surrounding portion is equal to or more than a predetermined value have been extracted, from the image captured by the camera; a candidate image portion extracting unit which extracts a candidate image portion, which is a candidate for an image portion of a lane mark, from the edge image; and a lane mark recognizing unit which detects a lane mark candidate based on the candidate image portion and, in a case of having detected a plurality of lane mark candidates adjacent to each other, calculates a reference value based on a luminance of a corresponding area in the captured image with respect to each of the lane mark candidates adjacent to each other and recognizes a lane mark candidate having a maximum reference value as a lane mark.

According to the lane mark recognition device of the present invention, the lane mark recognizing unit detects a lane mark candidate on the basis of the candidate image portion extracted by the candidate image extracting unit. Furthermore, in the case of having detected a plurality of lane mark candidates, the lane mark recognizing unit calculates the reference value with respect to each lane mark candidate and recognizes a lane mark candidate having the maximum reference value as a lane mark. In this regard, the corresponding area of a repair mark of the lane mark in the captured image has a lower reference value than that of the corresponding area of an actual lane mark, where the reference value indicates the feature value of the lane mark.

Therefore, the lane mark recognizing unit recognizes a lane mark candidate having the maximum reference value as a lane mark, thereby preventing the repair mark of the lane mark from being erroneously recognized as a lane mark.

Moreover, the lane mark recognition device is characterized in that the camera is a color camera, the lane mark recognizing unit recognizes a lane mark having a specific color, and the reference value is a value indicating a degree of the specific color of the corresponding area.

According to this configuration, in the case where the recognition object of the lane mark recognizing unit is a lane mark having a specific color, the lane mark is able to be recognized while excluding a repair mark of the lane mark where specific-color portions are decreased.

Moreover, the lane mark recognition device is characterized in that the reference value is a luminance value of the corresponding area.

According to this configuration, the lane mark is able to be recognized while excluding the repair mark of the lane mark through simple processing by using a luminance value of the corresponding area as the reference value.

Moreover, the lane mark recognition device is characterized in that the lane mark recognizing unit determines whether the plurality of lane mark candidates include a continuous-line lane mark and a dashed-line lane mark in a case where a difference in the reference value between the plurality of lane mark candidates adjacent to each other is equal to or less than a predetermined value and recognizes the plurality of lane mark candidates as a composite-line lane mark in a case where the plurality of lane mark candidates include a continuous-line lane mark and a dashed-line lane mark.

According to this configuration, it is possible to prevent a situation where the continuous-line or dashed-line lane mark which is a part of a composite-line lane mark is excluded as a repair mark of the lane mark and the composite-line lane mark is not recognized.

Moreover, the lane mark recognition device further includes a steering control unit which performs steering control of the vehicle so that the vehicle travels within a lane demarcated by the lane mark recognized by the lane mark recognizing unit.

According to this configuration, it is possible to prevent the steering control of the vehicle from being performed by using a lane mark erroneously recognized on the basis of the repair mark of the lane mark.

Subsequently, a vehicle according to the present invention includes: a camera which captures an image of surroundings; an edge image generating unit which generates an edge image, into which edge points whose variation in luminance relative to a surrounding portion is equal to or more than a predetermined value have been extracted, from the image captured by the camera; a candidate image portion extracting unit which extracts a candidate image portion, which is a candidate for an image portion of a lane mark, from the edge image; and a lane mark recognizing unit which detects a lane mark candidate based on the candidate image portion and, in a case of having detected a plurality of lane mark candidates adjacent to each other, calculates a reference value based on a luminance of a corresponding area in the captured image with respect to each of the lane mark candidates adjacent to each other and recognizes a lane mark candidate having a maximum reference value as a lane mark.

According to the vehicle of the present invention, the lane mark recognizing unit detects a lane mark candidate on the basis of the candidate image portion extracted by the candidate image extracting unit. Thereafter, in the case of having detected a plurality of lane mark candidates, the lane mark recognizing unit calculates the reference value with respect to each lane mark candidate and recognizes the lane mark candidate having the maximum reference value as a lane mark. In this regard, the corresponding area of the repair mark of the lane mark in the captured image has a lower reference value than that of the corresponding area of an actual lane mark, where the reference value indicates the feature amount of the lane mark.

Therefore, the lane mark recognizing unit recognizes the lane mark candidate having the maximum reference value as a lane mark, thereby preventing the repair mark of the lane mark from being erroneously recognized as a lane mark.

Subsequently, a lane mark recognition method according to the present invention includes: an edge image generating step of generating an edge image, into which edge points whose variation in luminance relative to a surrounding portion is equal to or more than a predetermined value have been extracted, from the image captured by the camera; a candidate image portion extracting step of extracting a candidate image portion, which is a candidate for an image portion of the lane mark, from the edge image; and a lane mark recognizing step of detecting a lane mark candidate based on the candidate image portion and, in a case of having detected a plurality of lane mark candidates adjacent to each other, calculating a reference value based on a luminance of a corresponding area in the captured image with respect to each of the lane mark candidates adjacent to each other and recognizing a lane mark candidate having a maximum reference value as a lane mark.

According to the lane mark recognition method of the present invention, the lane mark candidate is detected by the lane mark recognizing step on the basis of the candidate image portion extracted by the candidate image portion extracting step. Furthermore, in the lane mark recognizing step, in the case of having detected a plurality of lane mark candidates, the reference value is calculated with respect to each lane mark candidate and a lane mark candidate having the maximum reference value is recognized as a lane mark. In this regard, the corresponding area of the repair mark of the lane mark in the captured image has a lower reference value than that of the corresponding area of an actual lane mark, where the reference value indicates the feature amount of the lane mark.

Therefore, the lane mark candidate having the maximum reference value is recognized as a lane mark by the lane mark recognizing step, thereby preventing the repair mark of the lane mark from being erroneously recognized as a lane mark.

BRIEF DESCRIPTION OF THE DRAWINGS

FIG. 1 is a block diagram illustrating a lane mark recognition device;

FIG. 2 is a flowchart of lane mark recognition processing;

DESCRIPTION OF THE PREFERRED EMBODIMENTS

Figure 3A:
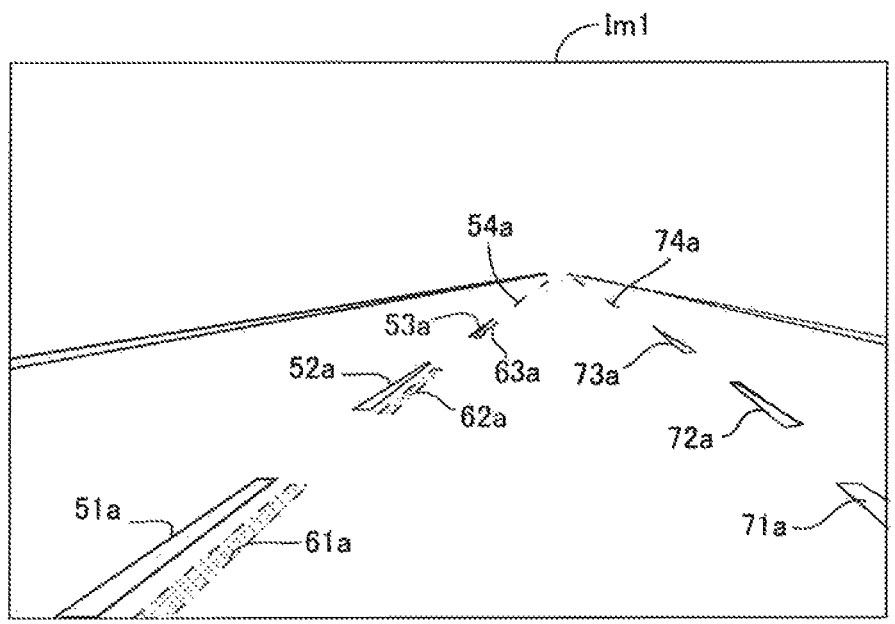
FIG. 3A is an explanatory diagram illustrating a grayscale image generated from a captured image.

An embodiment of a lane mark recognition device according to the present invention will be described with reference to FIGS. 1 to 5.

Referring to FIG. 1, a lane mark recognition device 10 is mounted in a vehicle 1 (corresponding to a vehicle of the present invention) provided with a camera 2 (color camera), a speaker 5, a display unit 6, and a steering mechanism 7.

The lane mark recognition device 10 is an electronic unit including a CPU, a memory, various interface circuits and the like, which are not illustrated, and executes programs for lane mark recognition and steering control retained in the memory in the CPU to function as a captured image acquiring unit 11, an edge image generating unit 12, a candidate image portion extracting unit 13, a lane mark recognizing unit 14, and a steering control unit 15. Moreover, the lane mark recognition device 10 performs a lane mark recognition method of the present invention.

With reference to the flowchart illustrated in FIG. 2, the following describes processing of recognizing a lane mark provided on a road by using the lane mark recognition device 10. The lane mark recognition device 10 recognizes a lane mark (a continuous-line lane mark and a dashed-line lane mark) on the road on which the vehicle 1 is traveling by performing processing of the flowchart illustrated in FIG. 2 at each predetermined control cycle.

STEP 1 in FIG. 2 is a process performed by the captured image acquiring unit 11. The captured image acquiring unit 11 inputs a video signal of a view ahead of the vehicle 1 (corresponding to the surroundings of a vehicle of the present invention) output from the camera 2 to acquire a color captured image 21 having the R, G and B values as data of each pixel from the color components (the R, G, and B values) of the video signal. The captured image acquiring unit 11 then retains the data of the captured image 21 in an image memory 20.

The subsequent STEP 2 is a process performed by the edge image generating unit 12. The process step performed by the edge image generating unit 12 corresponds to an edge image generating step in the lane mark recognition method of the present invention.

The edge image generating unit 12 performs a process of transforming the color components of the captured image 21 to the luminance to generate a grayscale image (a multivalued image). Then, the edge image generating unit 12 extracts edge points (pixels [an image portion] whose luminance difference [variation in luminance] from the pixels of the surroundings is a predetermined value or more) from the grayscale image to generate an edge image 22 (see FIG. 1).

In the case where the camera 2 is a monochromatic camera, a grayscale captured image is acquired from the luminance of the pixels and therefore it is unnecessary to perform the foregoing process of generating the grayscale image from the color captured image.

In this regard, reference character Im1 illustrated in FIG. 3A indicates an example of a grayscale image generated from the captured image 21, including the image portions of a dashed-line lane mark 51a to 54a on the left side and a dashed-line lane mark 71a to 74a on the right side which demarcate the lane on which the vehicle 1 (self-vehicle) is traveling. Additionally, the reference character Im1 includes the image portions 61*a* to 63*a* of a repair mark of the dashed-line lane mark adjacent to the dashed-line lane mark 51*a* to 54*a* on the left side.

Figure 3B:
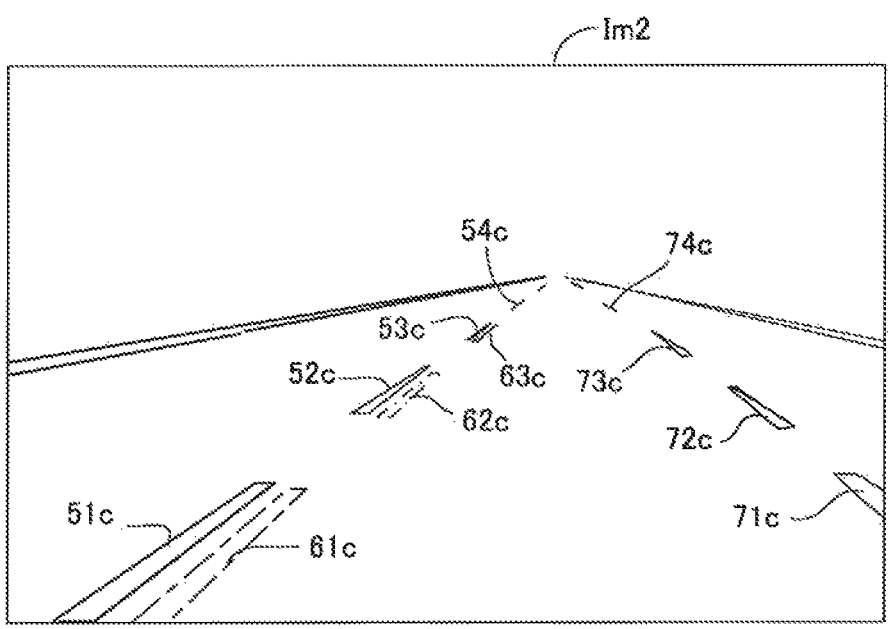
FIG. 3B is an explanatory diagram illustrating an edge image generated from the grayscale image.

Reference character Im2 in FIG. 3B indicates an edge image generated by performing edge extraction processing on the grayscale image Im1. In the edge image Im2, the image portions 51*c* to 54*c* of the dashed-line lane mark on the left side, the image portions 71*c* to 74*c* of the dashed-line lane mark on the right side, and the image portions 61*c* to 63*c* of the repair mark of the lane mark are image portions including plenty of linearly-continuous edge points.

The subsequent STEP 3 and STEP 4 are processes performed by the candidate image portion extracting unit 13. The candidate image portion extracting unit 13 performs labeling for labeling gathering edge points (hereinafter, referred to as "edge portion") and clustering for association of edge portions adjacent to each other as image portions of the same object for the edge image Im2.

Moreover, in STEP 4, the candidate image portion extracting unit 13 extracts image portions having the feature of a line (for example, image portions in which the percentage of linearly-continuous edge points is a predetermined level or more), as candidate image portions which are candidates for the image portions of a lane mark, out of the image portions extracted by the clustering.

The process step performed by the candidate image portion extracting unit 13 corresponds to a candidate image portion extracting step in the lane mark recognition method of the present invention.

The subsequent STEP 5 to STEP 8, STEP 20, STEP 21, and STEP 22 are processes performed by the lane mark recognizing unit 14.

The process step performed by the lane mark recognizing unit 14 corresponds to a lane mark recognizing step in the lane mark recognition method of the present invention.

In STEP 5, the lane mark recognizing unit 14 performs inverse projection transformation from the camera coordinates to the real space coordinates for each of the candidate image portions extracted in STEP 4 to calculate the position of an object in the real space corresponding to each candidate image portion. Incidentally, the lane mark recognizing unit 14 is allowed to exclude an image portion having a size equal to or less than a predetermined size (a size from which the image portion is supposed to be other than the image portion of a lane mark) from the candidate image portions.

Then, the lane mark recognizing unit 14 detects candidates for a dashed-line lane mark on the basis of candidate image portions continuous in a given direction whose length in the corresponding real space is within a predetermined range (set with reference to the length [specified length] of a dashed-line lane mark defined by a law).

Moreover, the lane mark recognizing unit 14 detects candidates for a continuous-line lane mark by using a known technique described in, for example, Japanese Patent Application Laid-Open No. H11-219435 in the case where the lane is demarcated by a continuous-line lane mark (a white line, a yellow line, etc.).

In the next STEP 6, the lane mark recognizing unit 14 determines whether or not a plurality of lane mark candidates (candidates for a dashed-line lane mark or candidates for a continuous-line lane mark) adjacent to each other have been detected. Incidentally, the term "adjacent" means, for example, that the lane mark candidates are laid on a road at a distance of a threshold value with an interval of 50 cm or less from each other in the real space. The threshold value is set on the basis of the situation where the lane marks are laid on the actual road.

If only one lane mark candidate has been detected in STEP 6, the processing proceeds to STEP 7, in which the lane mark recognizing unit 14 recognizes the detected lane mark candidate as a lane mark.

In contrast, if a plurality of lane mark candidates adjacent to each other have been detected, the processing branches from STEP 6 to STEP 20, in which the lane mark recognizing unit 14 calculates a luminance value (corresponding to a reference value of the present invention such as the mean value of luminance of an area, the maximum value of pixels of an area, etc.) of a corresponding area (an image portion of each lane mark) in the captured image with respect to each of the detected lane mark candidates.

Thereafter, the lane mark recognizing unit 14 determines whether a difference in the luminance value between the plurality of lane mark candidates is a predetermined value or less. If the difference in the luminance value between the plurality of lane mark candidates is the predetermined value or less, the processing branches to STEP 22. If the difference is greater than the predetermined value, the processing proceeds to STEP 21.

In STEP 21, the lane mark recognizing unit 14 recognizes a lane mark candidate having the maximum luminance value as a lane mark, and then the processing proceeds to STEP 8. Moreover, in STEP 22, the lane mark recognizing unit 14 recognizes a plurality of lane mark candidates whose difference in the luminance value is a predetermined value or less as a composite-line lane mark, and then the processing proceeds to STEP 8. In this case, it is also possible to determine whether or not the plurality of lane mark candidates include a continuous-line lane mark and a dashed-line lane mark and then to recognize the lane mark candidates as a composite-line lane mark if the lane mark candidates include a continuous-line lane mark and a dashed-line lane mark.

Figure 4:
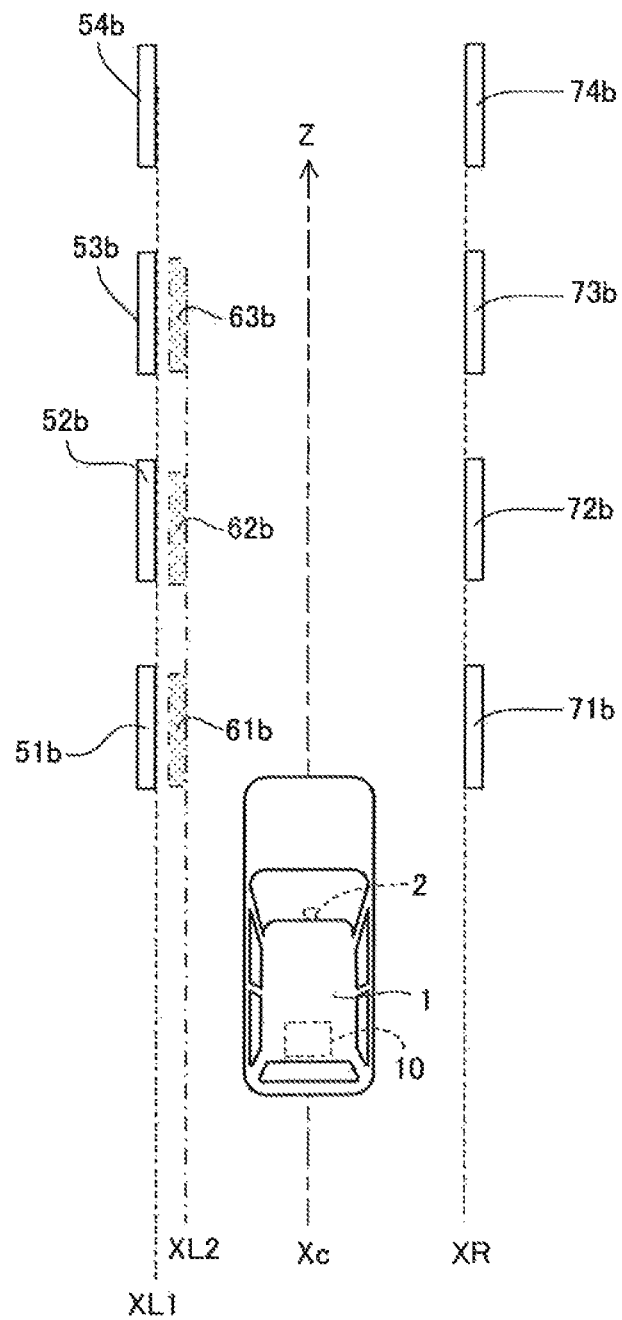
FIG. 4 is an explanatory diagram illustrating processing of excluding a repair mark of a lane mark.

In this regard, FIG. 4 illustrates a state where candidate image portions extracted from the edge image in FIG. 3B are transformed into real space positions by the inverse projection transformation, where the dashed-line lane mark 51*b* to 54*b* on the left side corresponding to the image portions 51*c* to 54*c*, the repair mark 61*b* to 63*b* of the dashed-line lane mark corresponding to the image portions 61*c* to 63*c*, and the dashed-line lane mark 71*b* to 74*b* on the right side corresponding to the image portions 71*c* to 74*c* are detected as lane mark candidates.

With respect to the lane mark on the right side, only one lane mark candidate 71*b* to 74*b* has been detected. Therefore, the lane mark candidate 71*b* to 74*b* is recognized as a lane mark.

Furthermore, with respect to the lane mark on the left side, the two lane mark candidates 51*b* to 54*b* and 61*b* to 63*b* adjacent to each other have been detected, and therefore the luminance values of the two lane mark candidates are compared with each other, so that the lane mark candidate 51*b* to 54*b* having a greater luminance value is recognized as a lane mark. This prevents the repair mark 61*b* to 63*b* of the lane mark from being erroneously recognized as a lane mark.

Figure 5:
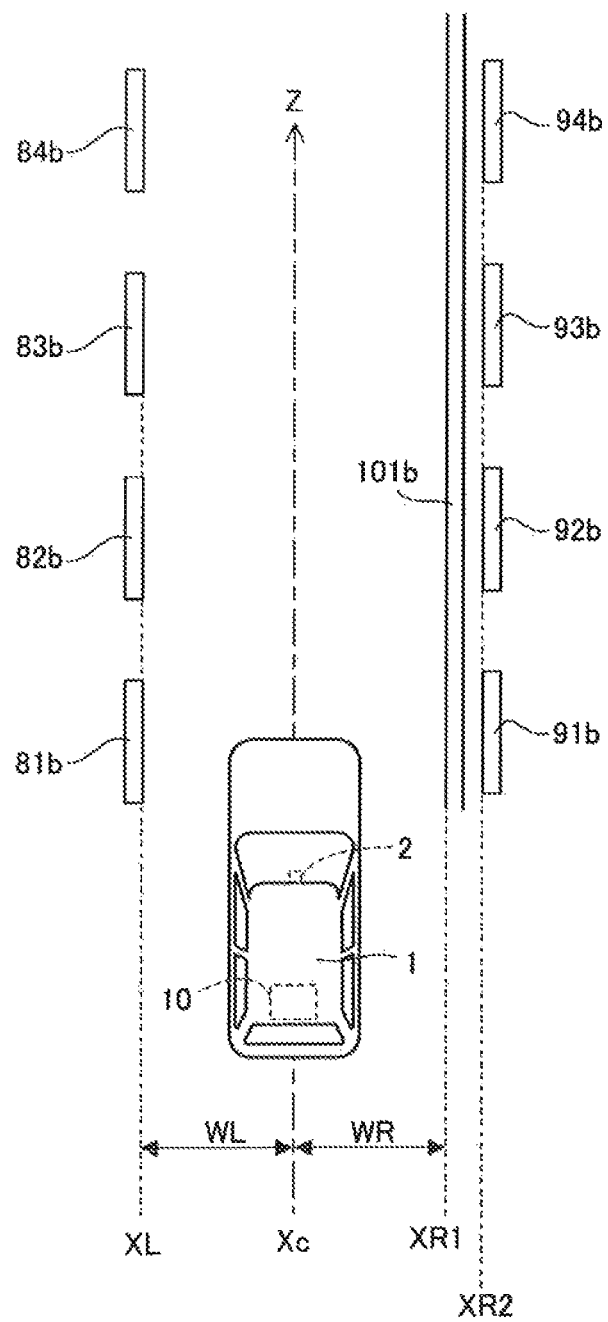
FIG. 5 is an explanatory diagram illustrating recognition processing of a composite-line lane mark.

Moreover, FIG. 5 illustrates an example in which a composite-line lane mark (a lane mark made up of a combination of a plurality of types of lane marks: a combination of a dashed-line lane mark and a continuous-line lane mark in FIG. 5) is laid on the right side of the lane on which the vehicle 1 is traveling.

In the case of the example in FIG. 5, two lane mark candidates 101*b* and 91*b* to 94*b* have been detected with respect to the lane mark on the right side. With respect to the lane mark on the left side, only one lane mark candidate 81b to 84b has been detected and therefore the lane mark candidate 81b to 84b is recognized as a lane mark.

Since a luminance difference between the two lane mark candidates 101b and 91b to 94b is small, the lane mark recognizing unit 14 recognizes two lane mark candidates 101b and 91b to 94b as a composite-line lane mark (STEP 22 in FIG. 2).

In the next STEP 8, the lane mark recognizing unit 14 recognizes the middle position of the lane on the basis of the positions of the right and left lane marks. In the example of FIG. 4, the lane mark recognizing unit 14 recognizes the middle position Xc between the inner position XL1 of the dashed-line lane mark 51b to 54b on the left side and the inner position XR of the dashed-line lane mark 71b to 74b on the right side. In this case, the middle position of the lane is prevented from being recognized as being more rightward than it really is on the basis of the inner position XL2 of the repair mark 61b to 63b of the lane mark.

Moreover, in the example of FIG. 5, the middle position Xc between the inner position XL of the dashed-line lane mark 81b to 84b on the left side and the inner position XR1 of the continuous-line lane mark 101b on the right side is recognized as the middle position of the lane. In this case, the middle position of the lane is prevented from being recognized as being more leftward than it really is on the basis of the inner position XR2 of the dashed-line lane mark 91b to 94b on the outer side of the composite-line lane mark.

The next STEP 9 is a process performed by the steering control unit 15. The steering control unit 15 activates the steering mechanism 7 to assist a driver in driving operation of the vehicle 1 so that the vehicle 1 travels near the middle position Xc within the lane. In this case, the steering control unit 15 issues a reminder to the driver through a sound output from the speaker 5 and a display on the display unit 6, as needed.

In this regard, in the case where a distance WR between the vehicle 1 and the right lane mark 101b or a distance WL between the vehicle 1 and the left lane mark 81b to 84b becomes a value equal to or less than a preset determination value due to an increase in the deviation of the vehicle 1 from the middle position Xc as illustrated in FIG. 5, the steering control unit 15 activates the steering mechanism 7 to control the vehicle 1 to approach the middle position Xc.

In addition, in the case where it is prescribed that a lane change to an adjacent lane is allowed with respect to the dashed-line lane mark side while a lane change is inhibited with respect to the continuous-line lane mark side, the driver does not feel reluctant to approach the dashed-line lane mark side. Therefore, the steering control unit 15 sets an allowable distance on the dashed-line lane mark side (the allowable distance WL on the left side in FIG. 5) to a value smaller than an allowable distance on the continuous-line lane mark side (the allowable distance WR on the right side in FIG. 5).

The setting of the allowable distance between the vehicle 1 and the lane mark in this manner causes an assist with steering control when the driver approaches the dashed-line lane mark without feeling reluctant so much, thereby enabling the suppression of excessive assist, which is troublesome to the driver.

[Modified Embodiment]

When a lane mark to be recognized is a white line, a value indicating a whiteness degree calculated from the RGB gradation value in the color captured image may be used as a reference value for distinguishing between a lane mark and a repair mark thereof. In this case, if a plurality of lane mark candidates have been detected, the lane mark recognizing unit 14 recognizes a lane mark candidate having the maximum reference value indicating the whiteness degree as a lane mark.

Similarly, when a lane mark to be recognized is a yellow line, a value indicating a yellowness degree calculated from the RGB gradation value in the color captured image may be used as a reference value for distinguishing between a lane mark and a repair mark thereof. In this case, if a plurality of lane mark candidates have been detected, the lane mark recognizing unit 14 recognizes a lane mark candidate having the maximum reference value indicating the yellowness degree as a lane mark.

With respect to a lane mark having a specific color other than the white or yellow color, a lane mark is also able to be distinguished from the repair mark of the lane mark by using a reference value indicating the degree of the specific color.

What is claimed is:

1. A lane mark recognition device which recognizes a lane mark provided on a road based, comprising:
   a vehicle having a camera configured to capture an image of surroundings of the vehicle; and
   an electronic control unit including at least a processor and a non-transitory computer readable medium containing instructions for controlling the processor to:
   generate an edge image, into which edge points whose variation in luminance relative to a surrounding portion is equal to or more than a predetermined value have been extracted, from the image captured by the camera;
   extract a candidate image portion, which is a candidate for an image portion of the lane mark, from the edge image; and
   detect a lane mark candidate based on the candidate image portion and, in a case of having detected at least a pair of lane mark candidates determine whether a distance between the pair of lane mark candidates on the road is equal to or less than a threshold value, and in a case that the distance is equal to or less than a threshold value, calculate a reference value based on a luminance of a corresponding area in the captured image with respect to each of the at least a pair of lane mark candidates and recognize a lane mark candidate having a maximum reference value as a lane mark; and
   perform steering control of the vehicle so that the vehicle travels within a lane demarcated by the lane mark.

2. The lane mark recognition device according to claim 1, wherein:
   the camera is a color camera;
   the lane mark recognizing unit recognizes a lane mark having a specific color; and
   the reference value is a value indicating a degree of the specific color of the corresponding area.

3. The lane mark recognition device according to claim 1, wherein the reference value is a luminance value of the corresponding area.

4. The lane mark recognition device according to claim 1, wherein the lane mark recognizing unit determines whether or not the plurality of lane mark candidates include a continuous-line lane mark and a dashed-line lane mark in a case where a difference in the reference value between the plurality of lane mark candidates adjacent to each other is equal to or less than a predetermined value and recognizes the plurality of lane mark candidates as a composite-line lane mark in a case where the plurality of lane mark candidates include the continuous-line lane mark and the dashed-line lane mark.

5. A vehicle comprising:

a camera which captures an image of surroundings;

an edge image generating unit which generates an edge image, into which edge points whose variation in luminance relative to a surrounding portion is equal to or more than a predetermined value have been extracted, from the image captured by the camera;

a candidate image portion extracting unit which extracts a candidate image portion, which is a candidate for an image portion of a lane mark, from the edge image;

a lane mark recognizing unit which detects a lane mark candidate based on the candidate image portion and, in a case of having detected at least a pair of lane mark candidates determines whether a distance between the pair of lane mark candidates on the road is equal to or less than a threshold value, and in a case that the distance is equal to or less than a threshold value, calculates a reference value based on a luminance of a corresponding area in the captured image with respect to each of the at least a pair of lane mark candidates and recognizes a lane mark candidate having a maximum reference value as a lane mark; and a steering control unit which performs steering control of the vehicle so that the vehicle travels within a lane demarcated by the lane mark recognized by the lane mark recognizing unit.

6. A lane mark recognition method of recognizing a lane mark provided on a road based on an image of surroundings of a vehicle captured by a camera mounted in the vehicle, comprising:

an edge image generating step of generating an edge image, into which edge points whose variation in luminance relative to a surrounding portion is equal to or more than a predetermined value have been extracted, from the image captured by the camera;

a candidate image portion extracting step of extracting a candidate image portion, which is a candidate for an image portion of the lane mark, from the edge image;

a lane mark recognizing step of detecting a lane mark candidate based on the candidate image portion and, in a case of having detected at least a pair of lane mark candidates determining whether a distance between the pair of lane mark candidates on the road is equal to or less than a threshold value, and in a case that the distance is equal to or less than a threshold value, calculating a reference value based on a luminance of a corresponding area in the captured image with respect to each of the at least a pair of lane mark candidates and recognizing a lane mark candidate having a maximum reference value as a lane mark; and a steering control step which performs steering control of the vehicle so that the vehicle travels within a lane demarcated by the lane mark recognized in the lane mark recognizing step.

* * * * *